(12) United States Patent
Zhang et al.

(10) Patent No.: US 7,729,110 B2
(45) Date of Patent: Jun. 1, 2010

(54) FIXING APPARATUS FOR HARD DISK DRIVE

(75) Inventors: Jun-Xiong Zhang, Shenzhen (CN); Xin-Hu Gong, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 124 days.

(21) Appl. No.: 11/963,871

(22) Filed: Dec. 24, 2007

(65) Prior Publication Data
US 2009/0129009 A1    May 21, 2009

(30) Foreign Application Priority Data
Nov. 15, 2007    (CN) .......................... 2007 1 0202563

(51) Int. Cl.
*G06F 1/16* (2006.01)
(52) U.S. Cl. ................ 361/679.33; 248/633; 364/708.1; 439/638; 360/244.3

(58) Field of Classification Search ................. 248/618, 248/633; 361/679.26, 679.27, 679.3, 679.33, 361/679.35; 364/708.1; 439/638; 360/244.3
See application file for complete search history.

(56) References Cited

U.S. PATENT DOCUMENTS

| | | | | |
|---|---|---|---|---|
| 5,654,873 | A | * | 8/1997 | Smithson et al. ........ 361/679.37 |
| 7,016,190 | B1 | * | 3/2006 | Chang .................... 361/679.33 |
| 7,492,586 | B2 | * | 2/2009 | Peng et al. .................. 248/694 |
| 2007/0211422 | A1 | * | 9/2007 | Liu et al. ..................... 361/685 |

* cited by examiner

*Primary Examiner*—Hung V Duong
(74) *Attorney, Agent, or Firm*—Frank R. Niranjan

(57) ABSTRACT

An exemplary fixing apparatus is for mounting a hard disk drive having a plurality of holes in sidewalls thereof. The fixing apparatus includes a first side plate, a bracket, a locking tab, and a transverse bar. The bracket includes an end plate, and a second side plate perpendicular to the end plate. The first side plate is pivotably attached to a free end of the end plate of the bracket. The transverse bar is pivotably attached to a free end of the second side plate of the bracket. The locking tab is attached to an outside of the first side plate to detachably engage with the transverse bar.

15 Claims, 4 Drawing Sheets

FIXING APPARATUS FOR HARD DISK DRIVE

CROSS-REFERENCES TO RELATED APPLICATION

Relevant subject matter is disclosed in the 6 co-pending U.S. patent application Ser. Nos. (11/963,867, 11/963,869, 11/963,868, 11/963,864, 11/963,865, 11/963,870); filed on the same date and having a same title as the present application, which are assigned to the same assignee as this patent application. Relevant subject matter is also disclosed in the co-pending U.S. patent application Ser. No. 11/953,863, filed on Dec. 11, 2007, having a same title as the present application, which is assigned to the same assignee as this patent application.

BACKGROUND

1. Field of the Invention

The present invention relates to fixing apparatuses, and particularly to a fixing apparatus for hard disk drives (HDDs).

2. Description of Related Art

The conventional approach now being adopted to mount an HDD in a computer chassis generally involves placing the HDD in a holding area of a drive bracket; screwing a plurality of screws through side walls of the drive bracket into two sides of the HDD to fasten the HDD on the drive bracket; and mounting the HDD and the bracket in a computer chassis or a mobile HDD rack. For proper balanced installation of the HDD, multiple screws should be fastened at the same time, making installation and removal of the HDD tedious.

What is desired, therefore, is a fixing apparatus which allows convenient installation and removal of an HDD.

SUMMARY

An exemplary fixing apparatus is for mounting a hard disk drive having a plurality of holes in sidewalls thereof. The fixing apparatus includes a first side plate, a bracket, a locking tab, and a transverse bar. The bracket includes an end plate, and a second side plate perpendicular to the end plate. The first side plate is pivotably attached to a free end of the end plate of the bracket. The transverse bar is pivotably attached to a free end of the second side plate of the bracket. The locking tab is attached to an outside of the first side plate to detachably engage with the transverse bar.

Other advantages and novel features will become more apparent from the following detailed description when taken in conjunction with the accompanying drawings, in which:

DETAILED DESCRIPTION OF THE EMBODIMENT

Figure 1:
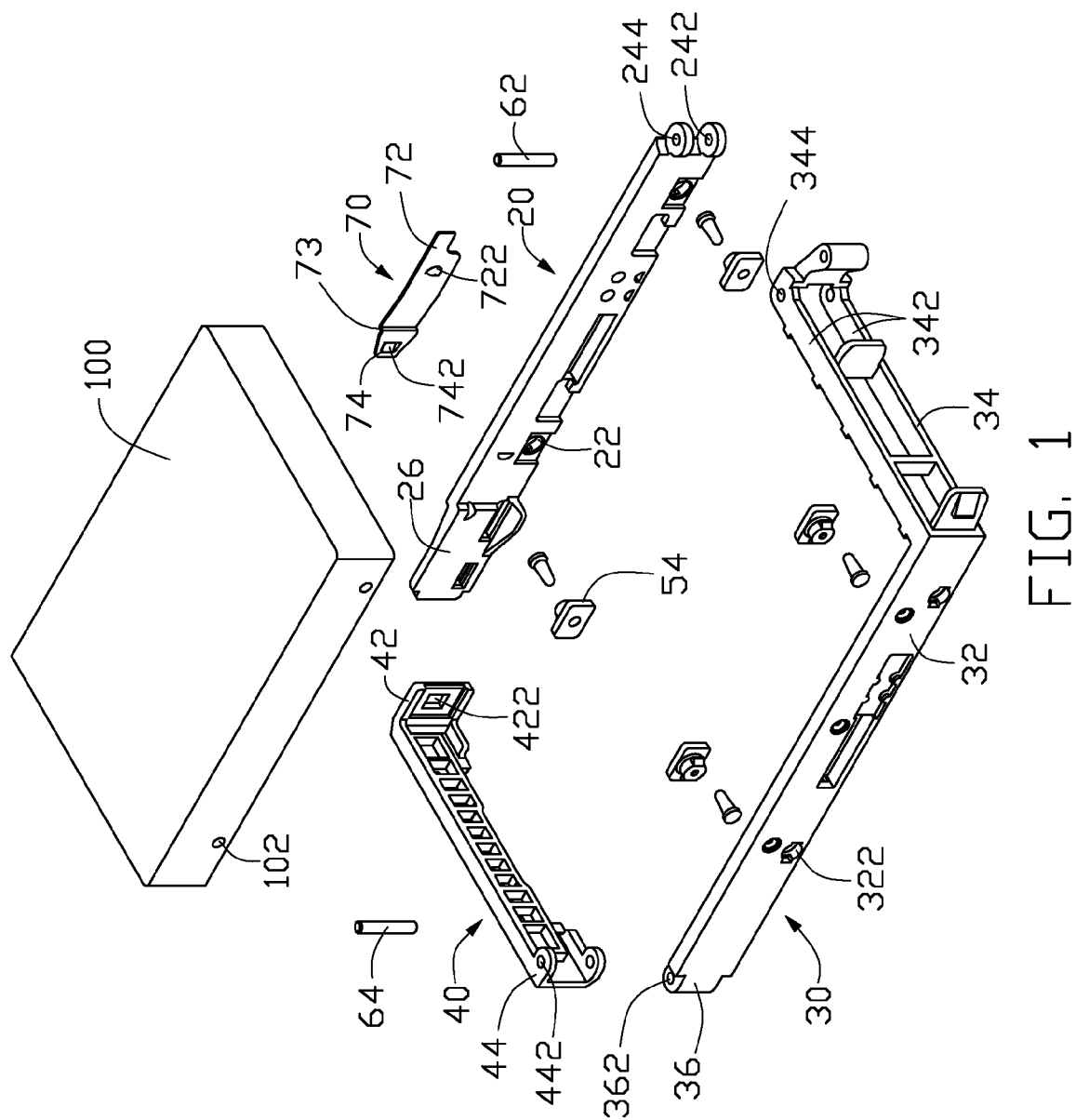
FIG. 1 is an exploded, isometric view of a fixing apparatus of an embodiment of the present invention together with an HDD.
Figure 2:
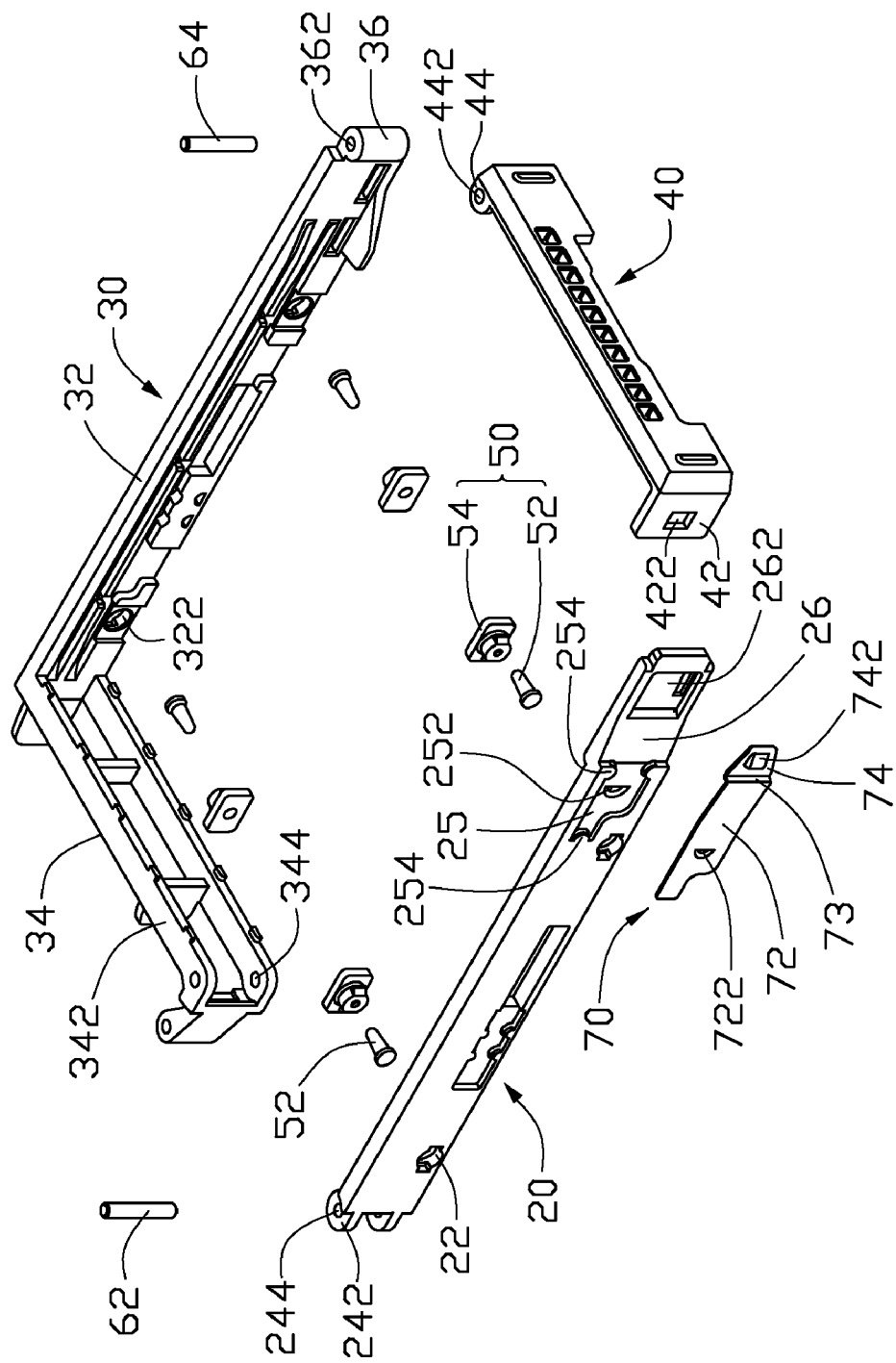
FIG. 2 is an exploded, isometric view of the fixing apparatus of FIG. 1, but viewed from a different aspect.

Referring to FIGS. 1 and 2, a fixing apparatus in accordance with an embodiment of the present invention is for fixing a hard disk drive (HDD) 100 and includes a first side plate 20, a bracket 30, a transverse bar 40, a plurality of fixing members 50, two shafts 62, 64, and a locking tab 70.

The HDD 10 includes a pair of holes 102 defined in each of two opposite sidewalls thereof.

The first side plate 20 includes a pair of spaced and parallel ears 242, each having a pivoting hole 244 defined therein, extending from one end thereof. An extension portion 26 extends slightly inward from the other end of the first side plate 20. A rectangular recess 262 is defined in an outside of the extension portion 26. An irregular recess 25 is defined in the first side plate 20 beside the extension portion 26. A retaining dent 252 is defined in the irregular recess 25. A plurality of latch tips 254 extends from the outside of the first side plate 20 to the irregular recess 25. A plurality of mounting holes 22 is defined in the first side plate 20.

The bracket 30 includes a second side plate 32, and an end plate 34 perpendicularly formed at one end of the second side plate 32. The second side plate 32 includes a pivoting portion 36 having a pivoting hole 362 formed at an inside of the other end of the second side plate 32. The end plate 34 includes a pair of spaced walls 342 each perpendicular to the second side plate 32. A pair of pivoting holes 344 is defined in free end portions of the walls 342, respectively. A plurality of mounting holes 322 is defined in the second side plate 32.

The transverse bar 40 includes a locking portion 42 having a locking hole 422 extending perpendicularly from one end thereof, and a pair of spaced and parallel ears 44, each having a pivoting hole 442 defined therein, extending from the other end thereof.

The fixing members 50 engage in the mounting holes 22 of the first side plate 20 and the mounting holes 322 of the second side plate 32 of the bracket 30 and each includes a cap 54, and a fixing pin 52 with one end embedded in the cap 54.

The locking tab 70 includes a mounting portion 72, a connecting portion 73 extending perpendicularly from an end of the mounting portion 72, and a locking portion 74 extending slantingly from a free end of the connecting portion 73. A retaining protrusion 722 extends inward from the mounting portion 72. A wedged block 742 extends outward from the locking portion 74.

Figure 3:
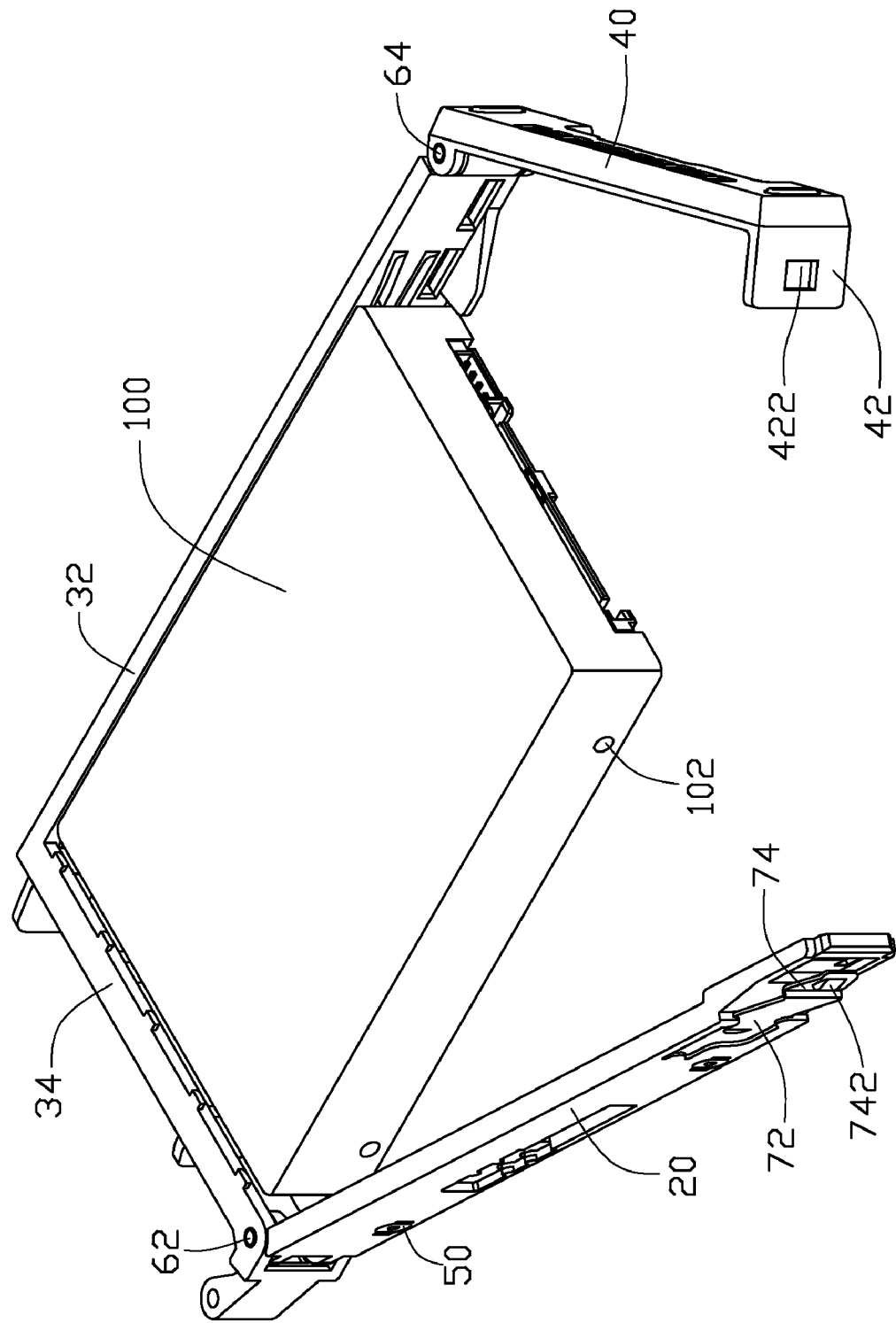
FIGS. 3 and 4 are assembled views of the fixing apparatus of FIG. 2 together with an HDD, respectively showing the fixing apparatus in a releasing position and a locking position.
Figure 4:
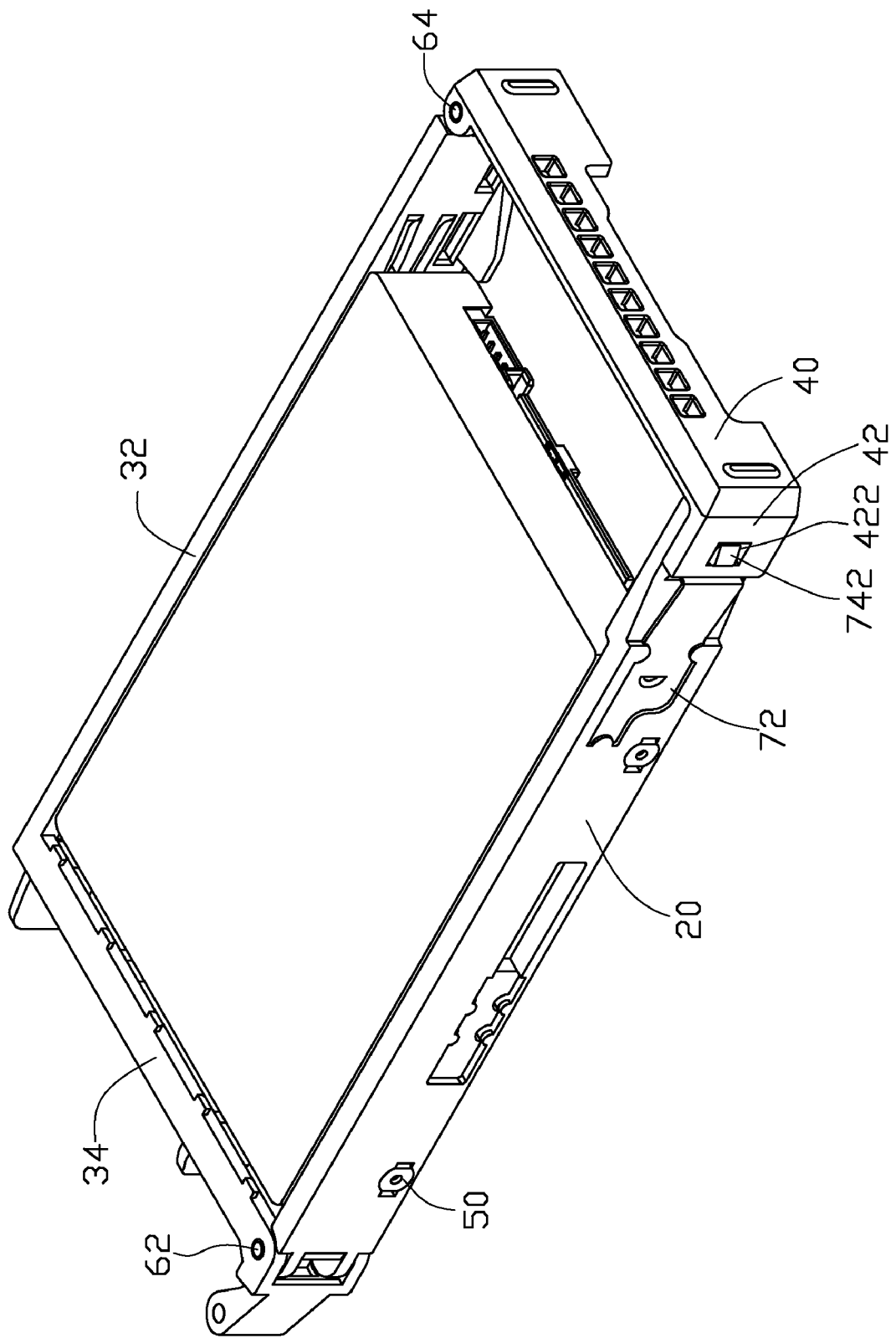

Referring to FIGS. 3 and 4, in assembly, the locking tab 70 is attached to the first side plate 20, with the mounting portion 72 inserted into the irregular recess 25 of the first side plate 20. The retaining protrusion 722 snappingly engages in the retaining dent 254 of the first side plate 20, and the latch tips 254 engage with an outside of the mounting portion 72. The first side plate 20 is pivotably attached to the end plate 34 of the bracket 30, with the ears 242 of the first side plate 20 sandwiched between the walls 342 of the end plate 34, and the shaft 62 extending through the pivoting holes 344 of the bracket 30 and the pivoting holes 244 of the first side plate 20. The transverse bar 40 is pivotably attached to the second side plate 32 of the bracket 30, with the pivoting portion 36 of the bracket 30 sandwiched between the ears 44 of the transverse bar 40, and the shaft 64 extending through the pivoting holes 442 and the pivoting hole 362 of the bracket 30. The locking hole 422 of the transverse bar 40 detachably engages with the wedged block 742 of the tab 70 of the first side plate 20.

In use, the mounting portion 72 of the locking tab 70 is pushed inward so that the wedged block 742 of the locking tab 70 disengages from the locking hole 422 of the transverse bar 40. Then, the transverse bar 40 is pivoted about the shaft 64, and the first side plate 20 is pivoted about the shaft 62, away from the bracket 30 respectively. The HDD 100 is placed in the bracket 30, with the pins 54 of the fixing members 50 of the second side plate 32 of the bracket 30 extending into the holes 102 of one sidewall of the HDD 100. Then, the first side plate 20 is pivoted toward the HDD 100 so that the pins 54 of the fixing members 50 of the first side plate 20 extend into the holes 102 of the other sidewall of the HDD 100. Subsequently, the transverse bar 40 is pivoted toward the first side plate 20 so that the locking hole 422 of the transverse bar 40 detachably engages with the wedged block 742 of the locking tab 70 of the first side plate 20. Thus, the HDD 100 is secured.

To release the HDD 100, the mounting portion 72 of the tab 70 is pushed inward so that the wedged block 742 of the tab 70 disengages from the locking hole 422 of the transverse bar 40 as above described, so that, the transverse bar 40 and the first side plate 20 can be pivoted away from each other. The HDD 100 can then be easily removed.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments.

What is claimed is:

1. A fixing apparatus for fixing a hard disk drive (HDD) with a plurality of holes defined in sidewalls thereof, the fixing apparatus comprising:
    a first side plate;
    a locking tab with one end thereof attached to an outside of one end of the first side plate;
    a bracket comprising an end plate pivotably engaging with the other end of the first side plate opposite to the locking tab, and a second side plate perpendicularly extending from the end plate;
    a transverse bar pivotably attached to a free end of the second side plate of the bracket opposite to the end plate of the bracket, and detachably engaging with the other end of the locking tab; and
    a plurality of fixing members attached to the first side plate and the second side plate to engage in the holes of HDD.

2. The fixing apparatus as claimed in claim 1, wherein the first side plate comprises a first recess defined therein, a plurality of latch tips extending beside the first recess, and a retaining dent defined in the first recess, the locking tab comprises a mounting portion maintained in the first recess and engaging with the latch tips, and a retaining protrusion extending from the mounting portion to snappingly engage in the dent.

3. The fixing apparatus as claimed in claim 2, wherein the first side plate further comprises an extension portion extending slightly inward beside the first recess, the extension portion comprises a second recess defined therein, the locking tab comprises a locking portion movably retained in the second recess, and a connecting portion perpendicularly disposed between the locking portion and the mounting portion.

4. The fixing apparatus as claimed in claim 3, wherein the transverse bar comprises a locking portion having a locking hole formed at one end thereof, the locking portion of the locking tab comprises a wedged block extending therefrom to engage in the locking hole of the transverse bar.

5. The fixing apparatus as claimed in claim 4, wherein the transverse bar comprises a pair of spaced and parallel ears, each having a pivoting hole defined therein, extending from the other end thereof, the free end of the second side plate of the bracket comprises a pivoting portion having a pivoting hole sandwiched between the ears of the transverse bar, a shaft extends through the pivoting holes of the transverse bar and the pivoting portion of the second side plate.

6. The fixing apparatus as claimed in claim 1, wherein the free end of the end plate of the bracket comprises a pair of spaced and parallel walls having a pair of pivoting holes defined in free end portions thereof respectively, the first side plate comprises a pair of spaced and parallel ears each having a pivoting hole and sandwiched between the walls of the end plate, a shaft extends through the pivoting holes of the first side plate and the end plate of the bracket.

7. The fixing apparatus as claimed in claim 1, wherein each of the fixing members comprises a cap inserted into the first side plates or the second side plate, and a fixing pin with one end embedded in the cap and extending into the holes of the HDD.

8. The fixing apparatus as claimed in claim 7, wherein the cap is made of shock absorbing materials.

9. An assembly comprising:
    a hard disk drive (HDD) with a plurality of holes defined in opposite sidewalls thereof;
    a first side plate;
    an L-shaped bracket comprising a second side plate, and an end member perpendicularly extending from the second side plate, the first side plate connected to the end plate and pivotably related to the end plate between a first position to sandwich the HDD with the second side plate, and a second position to disengage from the HDD;
    a transverse bar forming a first end pivotably connected to the second side plate, and a second end opposite to the first end and being detachably locked to the first side plate to retain the first side plate at the first position.

10. The assembly as claimed in claim 9, further comprising a plurality of fixing members attached to the first side plate and the second side plate and retractably engaging in the holes of the HDD.

11. The assembly as claimed in claim 10, wherein the first side plate comprises a first recess defined therein, a plurality of latch tips extending beside the first recess, and a retaining dent defined in the first recess, the locking tab comprises a mounting portion maintained in the first recess and engaging with the latch tips, and a retaining protrusion extending from the mounting portion to snappingly engage in the dent.

12. The assembly as claimed in claim 11, wherein the first side plate further comprises an extension portion extending slightly inward beside the first recess, the extension portion comprises a second recess defined therein, the locking tab comprises a locking portion movably retained in the second recess, and a connecting portion perpendicularly disposed between the locking portion and the mounting portion.

13. The assembly as claimed in claim 9, further comprising a locking tab attached to first side plate, wherein the transverse bar comprises a locking portion defining a locking hole, the locking portion of the locking tab comprises a wedged block extending therefrom to engage in the locking hole of the transverse bar.

14. The assembly as claimed in claim 13, wherein the transverse bar comprises a pair of spaced and parallel ears, each having a pivoting hole defined therein, extending from the second end of transverse bar, the free end of the second side plate of the bracket comprises a pivoting portion having a pivoting hole sandwiched between the ears of the transverse bar, a shaft extends through the pivoting holes of the transverse bar and the pivoting portion of the second side plate.

15. The assembly as claimed in claim 9, wherein the free end of the end plate of the bracket comprises a pair of spaced and parallel walls having a pair of pivoting holes defined in free end portions thereof respectively, the first side plate comprises a pair of spaced and parallel ears each having a pivoting hole and sandwiched between the walls of the end plate, a shaft extends through the pivoting holes of the first side plate and the end plate of the bracket.

* * * * *